June 8, 1954     R. R. GANNON     2,680,566
AIR CONDITIONING APPARATUS AND SYSTEM
Filed June 13, 1950     4 Sheets-Sheet 1

INVENTOR.
RUSSELL R. GANNON,
BY
Allen & Allen
ATTORNEYS.

June 8, 1954     R. R. GANNON     2,680,566
AIR CONDITIONING APPARATUS AND SYSTEM
Filed June 13, 1950     4 Sheets-Sheet 3

INVENTOR.
RUSSELL R. GANNON,
BY
Allen & Allen
ATTORNEYS.

June 8, 1954  R. R. GANNON  2,680,566
AIR CONDITIONING APPARATUS AND SYSTEM
Filed June 13, 1950  4 Sheets-Sheet 4

INVENTOR.
RUSSELL R. GANNON,
BY
Allen & Allen
ATTORNEYS.

Patented June 8, 1954

2,680,566

UNITED STATES PATENT OFFICE 2,680,566

AIR CONDITIONING APPARATUS AND SYSTEM

Russell R. Gannon, Cincinnati, Ohio

Application June 13, 1950, Serial No. 167,803

10 Claims. (Cl. 237—2)

My invention relates to new and improved heating, ventilating and air conditioning units, systems and methods.

It is an object of my invention to provide a unit for supplying warm air to a room without any danger of the heating coils being damaged or frozen by the cold fresh air introduced into the unit and without the necessity of expensive, specialized equipment being used to prevent such freezing.

A very important object of my invention is to provide a unit in which the only air to come into direct contact with the heating element is that air which is taken from the room being heated and recirculated thereinto, the cold fresh air which is introduced into the unit being heated only by mixture with the heated recirculated air in a compartment apart from the heating element.

Another object of my invention is to provide a novel system for heating a plurality of rooms, such system incorporating the individual units developed by me.

Still another object of my invention is to provide novel means for resiliently mounting the blower elements against vibration in my units.

Another object of my invention is to provide a unit in which provision is made for positive withdrawal of spent air from the room being conditioned, the means comprising such provision being intimately associated with the fresh air supply and with the means regulating recirculation of the return air.

A further object of my invention is to provide a novel housing for each of the individual blowers incorporated in one of my units.

Still another object of my invention is to provide novel means for the ionization of the fresh air introduced into one of my units.

Another object of my invention is to provide a system for heating a room which system utilizes one of my novel air conditioning units in combination with a novel radiant heat system positioned in the floor of the room to be heated.

A further object of my invention is to provide, within a room, a novel arrangement of the fresh air inlet, recirculated air inlet, room thermostat and spent air discharge means.

A still further object of my invention is to provide a room conditioning unit which may be placed in the hallway outside of the room and which is attractive in appearance, efficient in operation and economical to manufacture.

Other objects and advantages of my invention will become apparent to those skilled in the art during the course of the following description with reference being made to the attached drawings in which like numerals are used to designate like parts throughout and in which.

The basic principle underlying my invention in means, methods and systems for air conditioning rooms incorporates the idea that the fresh air admitted into the unit for transfer to the room should not come into direct contact with the heating element of the unit but rather, under those conditions which require its being heated, the heating of the fresh air should be accomplished simply by mixing it with air returned from the room, this latter air being heated if necessary. Such arrangement means that the only air coming into direct contact with the unit heating element is air which is already at room temperature. It thus becomes readily apparent that such an arrangement does not require any expensive, special construction of the heating coils in order to prevent their becoming frozen or similarly damaged. Coupled with this principle is the realization that in many rooms, such as school rooms, even in winter the problem is not one of how to heat the room air but rather it is a problem of how to keep such air from becoming too warm. By heating only the air to be recirculated, and then only if necessary, it should be readily apparent that my unit and system can serve as a heating means or cooling means as is required.

Basic room units

Figures 1, 2, 18:
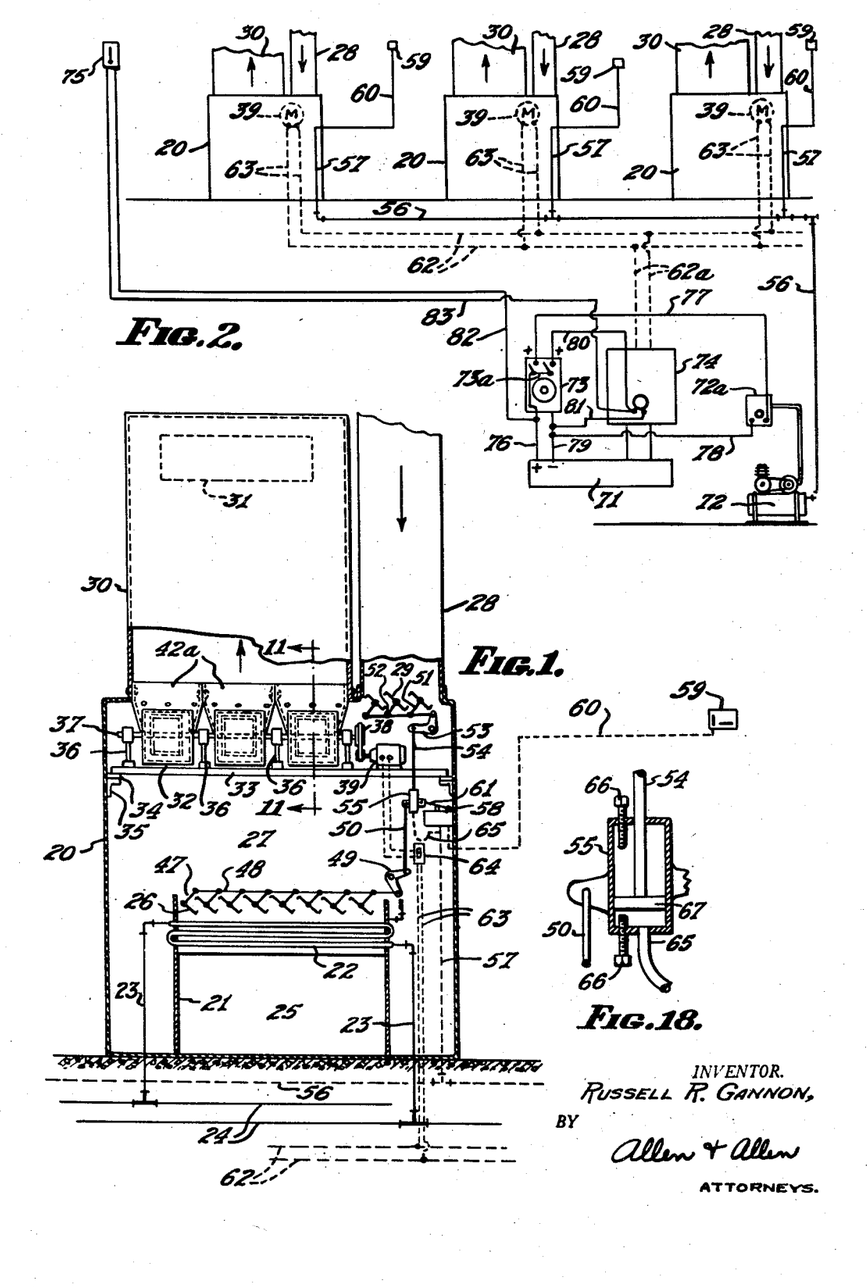
Figure 1 is a view, partly in section and partly in elevation, of one of my novel room conditioning units.
Figure 2 is a diagrammatic view of a system incorporating a plurality of room heating units.
Figure 18 is an enlarged detail view of a novel arrangement incorporated in the unit of Figure 1.

Referring now to Figure 1, 20 indicates the main frame or cabinet structure of a unit built according to my invention.

Enclosed within a housing 21 located near the bottom portion of the unit are a plurality of heating coils 22 through which a supply of steam or hot water may be passed. Such coils are diagrammatically illustrated as being connected through lines 23 with heat pipes 24 which may serve other rooms in the building. 25 represents the inlet area through which air passes from the room being heated, this air then continuing past the heating coils 22, around dampers 26 and into the mixing chamber generally indicated at 27.

Fresh air is admitted into the unit through a conduit 28 extending between a fresh air duct located somewhere in the building and the top of the cabinet structure 20 to which it is fastened. Air flowing in this conduit passes the dampers 29 and passes into the mixing chamber 27.

Also located near the top of the unit 20 is a supply plenum 30 which extends between the unit and the interior of a room to be conditioned. The plenum 30 preferably terminates with an anemostat or equal air diffusor 31 located flush with the interior wall of the room. A plurality of blowers 32 serve to withdraw the mixed fresh air and return air from the chamber 27 and discharge it into the conduit 30 and then into the room.

The blowers 32 are supported on frame members 33 which members are supported by a rubber mat or the like 34 fixed to the angle members 35 carried by the frame 20. A plurality of bearing stands 36 are mounted on the members 33 and a shaft 37 is journaled within these stands. The shaft 37 is driven through conventional gearing 38 by a motor 39 also located on the members 33. Each of the blowers, generally indicated at 32, comprises a pair of wheels 40 (see Figures 11 and 12) between which extend a plurality of blades 41, the wheels being fixed to the shaft 37 and the wheels and blades being enclosed within a housing 42.

It is a feature of my invention that while the blower wheels and blades, shaft 37 and motor 39 are all mounted on the resiliently supported member 33, the housing 42 is fixed to the frame 20 and supply plenum 30. I have found that this particular arrangement appreciably lessens noise and disturbances due to vibration.

Figure 11:
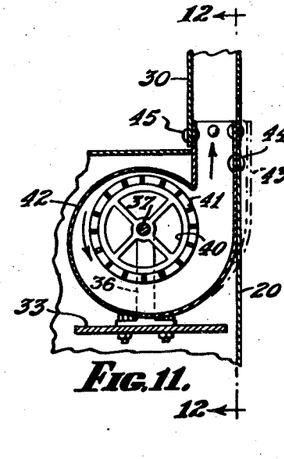
Figure 11 is a sectional view taken on the line 11—11 of Figure 1.
Figure 12:
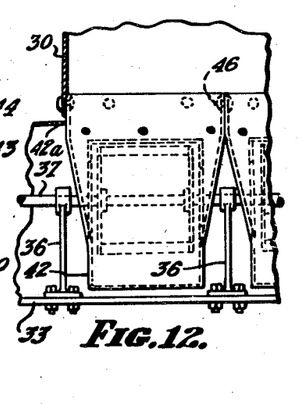
Figure 12 is a view taken on the line 12—12 of Figure 11.
Figure 13:
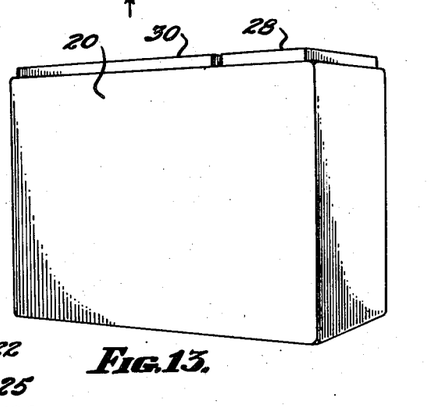
Figure 13 is a perspective view of the exterior of a unit of the type shown in Figure 1.

I have also provided a novel change in the construction of the blower housing 42. In Figure 11 I have indicated by the dotted lines 43 what would be the normal configuration of a blower housing of this type according to known constructions. In my construction, which provides as much cross sectional outlet area as is provided in presently known blower housings, the housing 42 is flattened out but at the same time widened as at 42a. Such an arrangement enables me to save space in the mounting of the blower within the unit and at the same time provide convenient means for spanning the whole area between the walls of supply plenum 30. Thus the housing portions 42a are secured together and also to the unit 20 and plenum 30 as indicated at 44 and 45 respectively. A juncture between housings 42a is indicated at 46 in Figure 12.

Referring again to Figure 1, it is a feature of my invention that the dampers 26 and 29 be so interconnected that when the dampers 26 are moved from closed position to open position, the dampers 29 are moved from open position to closed position. While it is to be understood that any suitable means for accomplishing this may be employed in my unit, I have shown a satisfactory linkage which comprises the following. Each of the dampers 26 is provided with a link 47 connecting it with a control rod 48. The rod 48 is pivotally connected to one arm of a bell crank 49 pivotally mounted within the cabinet 20. The other arm of the crank 49 is pivotally connected to a rod 50. Similarly, each of the dampers 29 is connected by a link 51 with a control rod 52. Such control rod is pivotally connected to one arm of a bell crank 53 suitably mounted within the cabinet 20, the other arm of such crank being pivotally connected to a rod 54. The rods 50 and 54 are connected together through means indicated at 55.

From the drawings, it will be apparent that when the rods 50—54 are moved upwardly the bell crank 53 is rotated about its pivot in a clockwise direction with the result that the control rod 52 is moved to the right as viewed in Figure 1 and the dampers 29 brought to their closed position. Simultaneously with this the crank 49 was rotated about its pivot in a counter-clockwise direction and the control rod 48 also moved to the right as viewed in Figure 1 with the result that the dampers 26 were brought to their open position. It will be readily understood that downward movement of the rods 50—54 will result in the dampers 29 being opened and the dampers 26 closed.

In Figure 1 I have diagramatically illustrated a compressed air system which may be utilized to operate the damper mechanism just described. A supply line containing compressed air is indicated at 56. From this line a branch 57 leads to a pneumatic damper motor 58. A room thermostat 59 controls the operation of the pneumatic damper motor 58 in conventional manner through a branch line 60. An operative connection between the link 50—54 and the motor 58 is indicated at 61. It is to be understood that the relation between room thermostat 59, damper motor 58 and connection 61 is such that upon a lowering of the temperature within the room the rods 50—54 will be moved upwardly and the dampers 29 brought to closed position while the dampers 26 are moved towards their open position, the amount of movement depending upon the temperature condition of the room. Similarly, when the temperature in the room rises to a predetermined temperature, the rods 50—54 will be moved downwardly and the dampers 29 moved towards their open position and the dampers 26 moved towards their closed position. Although such an arrangement has been described as one operating with compressed air, it is to be understood that other conventional arrangements may be employed.

Electric power supply lines are indicated at 62. From these lines branch lines 63 extend to the blower motor 39 through a normally closed switch 64. Thus whenever compressed air is admitted to the master supply line 56 and electric power to the master supply lines 62, the unit immediately becomes responsive to its individual room thermostat. And while so responsive, the blowers 32 will be in continuous operation.

In Figure 18 I have illustrated an embodiment of the connection 55 between rods 50 and 54 which is particularly well suited for use when the unit is to be installed within a building located in a state or other area having laws regulating and setting a minimum fresh air intake for school rooms and the like. In this arrangement the rod 54 operates as a piston within the cylindrical connection 55. Air is admitted into this cylinder 55 through a line 65 extending from the branch line 57. The amount of movement of the rod 54 within the cylinder 55 can be regulated by means of the screws 66 against which the piston head 67 will abut. Whenever compressed air is admitted into the supply line 56, not only are the pneumatic damper motor 58 and room thermostat 59 placed in operative position by reason of the air passing through branch line 57, but also the rod 54 is simultaneously moved to a predetermined position within the cylinder 55, with the result that the dampers 29 are moved to a predetermined open position. In this connection it should be noted that the position normally assumed by the dampers 29 and dampers 26 when compressed air is not in the line 56 is that the dampers 29 are fully closed and the dampers 26 are fully opened. The arrangement just described permits the dampers 29 to move from their fully closed position to a minimum setting of open position without any corresponding movement of the dampers 26 whatsoever. From this point on the dampers 26 and 29 will move together simultaneously as regulated by the thermostat 59 and motor 58.

The operation of my basic unit above described is as follows. Hot water or steam will be passed through the heating coils 22 from the supply lines 24. Compressed air will be admitted to the main line of supply 56 and electric power to the lines 62 with the result that the rod 54 will assume its predetermined position within the cylinder 55 whereby the dampers 29 are brought to a minimum open position. Meanwhile the dampers 26 will remain in their fully open position. From this time on the rods 50 and 54 will move as a unit and in the manner determined by the thermostat 59 and pneumatic motor 58. Simultaneously with all of this the motor 39 was actuated (the switch 64 being normally closed) and the blowers 32 brought into operation. These blowers operate to draw return air into the unit from the room and fresh air into the unit from the conduit 28, the amounts of both types of air being determined by the temperature of the room through thermostat 59, pneumatic motor 58, rods 50—54 and dampers 26 and 29. In no case will the fresh air come into contact with the heating coils 22. Such fresh air will simply be admitted into the mixing chamber 27 where it will intermingle with the return air which came into the unit through the opening 25, was then heated by the coils 22 and then passed into this chamber 27. The air will be drawn into the blower housings at the ends thereof and discharged through the enlarged portions 42a into the supply plenum 30. The mixture of fresh air and heated return air is then passed into the room through the anemostat or equal air diffusor 31.

In the evening, when it is desired to put the unit on a night basis, the compressed air and electric power supply will be shut off. When this happens the dampers 29 assume their fully closed position and the dampers 26 their fully open position, and at the same time the blower motor 39 is rendered inoperative. Some heat will probably be maintained within the coils 22 and this will serve to lend some degree of warmth to the room.

Figure 3:
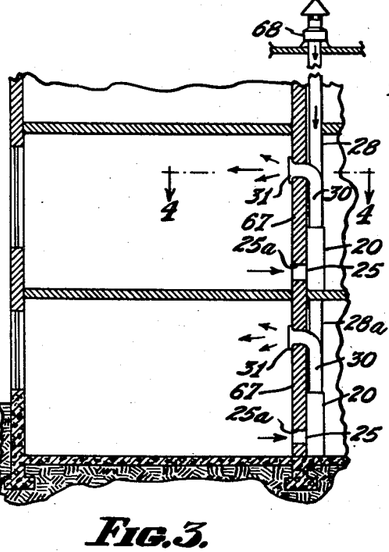
Figure 3 is a vertical sectional view through a building in which a plurality of my novel units are arranged.
Figures 4, 5:
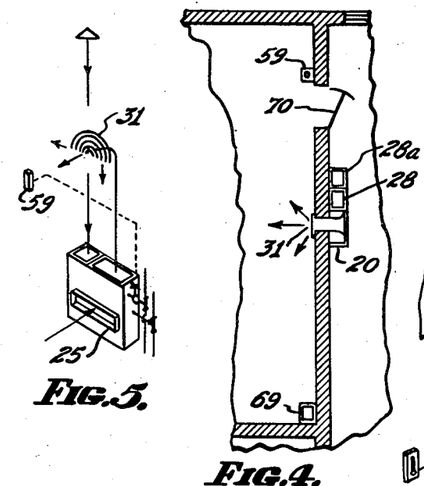
Figure 4 is a section taken on the line 4—4 of Figure 3.
Figure 5 is a diagrammatic perspective view of the arrangement shown in Figures 3 and 4.

Referring now to Figures 3 to 7, I have shown two ways in which the basic unit just described can be located within a school building or the like satisfactorily. In Figures 3 and 4 I have shown the basic unit 20 as located in the hallway outside of the room to be conditioned. The supply plenum 30 extends upwardly and through the wall 67 so that the anemostat 31 is located within the room. A passageway 25a in the wall communicates with the return air chamber 25 located near the bottom of the unit. Fresh air is brought into the unit 20 located on the first level through the conduit 28a. The fresh air duct is indicated at 68 and may be conveniently located on the roof of the building. Air which is not returned through the passageway 25a for recirculation is discharged, by pressure, through a ventilating unit 69 located in the room.

The relation among the air conduit 28, return air inlet 25, supply plenum 30, anemostat 31, thermostat 59, discharge ventilator 69 and door 70 provided in the room, forms a part of my invention. Referring again to Figure 1 and especially air conduit 28, return air inlet 25 and supply plenum 30, it will be observed that there will be more fresh air discharged from the right hand portion of the anemostat 31 (as viewed in Figure 1) than there will be fresh air discharged from the left side of such anemostat. In other words, mixture of the fresh air and return air will not be homogeneously accomplished in the chamber 27 because of the fact that some of the fresh air will move directly into the adjacent blowers rather than move downwardly into the mixing chamber 27. I take advantage of this situation by so arranging the thermostat 59, referring again to Figure 4, that it will be on that side of the anemostat from which the coolest air is being discharged, that is, from the side from which the freshest air is being discharged. Such thermostat will be so located that the door 70 will be between it and the anemostat.

The discharge ventilator 69 will be so located as to be on that side of the anemostat from which the warmest air is being discharged, that is, on the side of the anemostat from which most of the recirculated air is being discharged. By this arrangement the freshest air is made to travel through a greater portion of the room before being discharged than is the recirculated, somewhat more stale air. This latter air will find a much more direct path to the discharge ventilator 69 than will the fresh air initially started towards the opposite end of the room. Furthermore, such arrangement means that the thermostat 59 will be more sensitive to the fresher or cooler air than it will be to the staler or warmer air. Such relationship is diagrammatically illustrated in Figure 5.

Figure 6:
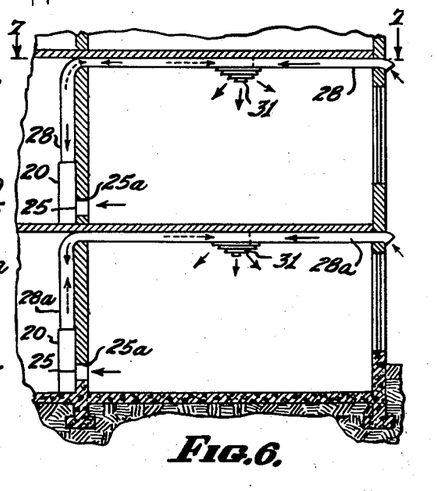
Figure 6 is a vertical sectional view through a building in which a plurality of my novel units are arranged in slightly different manner.
Figure 7:
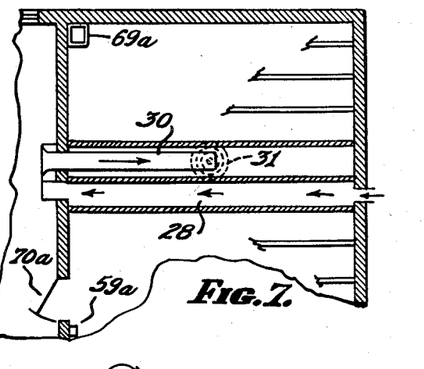
Figure 7 is a section on the line 7—7 of Figure 6.
Figure 8:
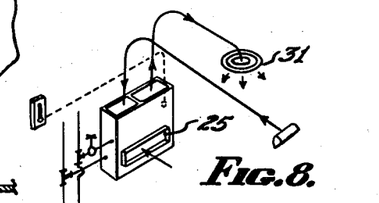
Figure 8 is a diagrammatic perspective view of the arrangement shown in Figures 6 and 7.

Figures 6 through 8 show an arrangement generally similar to that just described in connection with Figures 3 through 5 with the exception that the fresh air for each room is brought in through a conduit located at the ceiling of each room. It should again be noted that I have also maintained the same general arrangement just described.

Thus referring to Figure 7 it will be observed that I have so positioned the thermostat 59a that it will again be on the side of the anemostat from which the fresher air is being discharged into the room and also that the door 70a will be located between it and the anemostat. Also, the discharge ventilator 69a is located on that side of the anemostat from which the warmer air is being discharged. As is the case with the arrangement shown in Figures 3 through 5, the thermostat is again made more sensitive to the fresher air and such air is permitted to stay in the room longer than is the recirculated air.

Another feature of my invention is that in my method of mixing heated return air with non-heated fresh air, and in my unit for so mixing the air, the heated air and fresh air are so introduced into the mixing area that they meet "head on" to insure the best possible mixing.

Having now described a basic air conditioning unit invented by me and having described a novel way in which such unit may be located with respect to a room to be conditioned, and having described the basic principles underlying my methods for supplying heated air to a room, I shall proceed with the description of a novel system incorporating a plurality of the basic units and arranged on a night-day cycle.

*Night-day system including a plurality of basic room units*

Referring now to Figure 2 I shall describe a novel system of heating or conditioning a room throughout an entire 24 hour period. Although this figure is largely diagrammatic, I have used the same reference numerals to designate parts previously referred to wherever possible. Thus the individual room thermostat for each unit is indicated at 59, the basic unit at 20, the fresh air inlet at 28, the supply plenum at 30, the blower motor at 39, the main electric supply line at 62, the branch electric lines at 63, the main compressed air line at 56, the branch compressed air lines at 57 and 60 and other parts are indicated. In general it is contemplated that each of the units indicated at 20 is similar to that described in connection with Figure 1.

A power service or connection box is shown at 71 and an air compressor is indicated at 72. A time clock is shown at 73 and an automatic starter for all the blower motors 39 is indicated at 74 (it being remembered that the switch 64 is normally closed). I also provide a master thermostat 75 which thermostat will be located in any selected room as will be described more fully shortly.

The power service 71 is connected with the starter 72a for the air compressor 72 through the time clock 73. The time clock is of conventional design and is so arranged that at predetermined times the switch 73a is brought either to its open or its closed position as desired. When the switch 73a is in closed position, a circuit is completed between lead 76, lead 77, lead 78 and lead 79 with the result that starter 72a is energized and the air compressor 72 put into operation. When the switch 73a is opened, this last mentioned circuit is broken and the air compressor shut off.

Similarly the power service 71 is connected through the time clock 73 to the automatic starter 74 as follows. A circuit is established through lead 76, lead 80 (through the right side of switch 73a) lead 81 and lead 79. Completion of this circuit results in electric power being supplied through the lines 62a to the lines 62 at which instant all of the motors 39 will be energized.

The power service 71 is also connected to the automatic starter 74 through the master thermostat 75. When this thermostat reaches a predetermined temperature it will complete the connection between leads 82 and 83 with the result that a circuit is completed as follows: through line 76, lead 82, lead 83, lead 81 and lead 79. It should be observed that the completion of this circuit depends in no way upon the position of switch 73a within the time clock 73.

The operation of this system is as follows: I shall assume that it is desired to have the individual room units operate according to their own needs during the hours from 8 a. m. to 4:30 p. m. Thus the time clock shall be so set that at 8 a. m. the switch 73a is closed and at 4:30 p. m. the switch 73a is opened. When this switch closes, the automatic starter for the blower motors 39 will be actuated as above described and these motors thereby started. Simultaneously with this a circuit will be completed through the starter 72a for the air compressor 72 with the result that air is supplied through the line 56a to the master line 56 for the various room thermostats 59. Under these conditions, that is, with compressed air being supplied to all the thermostats and each of the blower motors 39 being in operation, each of the units 20 will operate according to its own individual needs and in the manner described in connection with the unit of Figure 1. Thus the dampers 29 will, at 8 a. m., immediately proceed to a minimum air inlet position while the dampers 26 remain fully open. From this time on the dampers 29 and 26 will move in unison as determined by the thermostat 59, pneumatic damper motor 58, connection 61 and linkage 50—54. It will be understood that the janitor has seen to it that the various heating coils are properly supplied with steam or hot water from the central boiler system. If the temperature in any one room should rise above a predetermined figure such as 70°, the thermostat 59 will so act as to move the dampers 29 to a more open position and the dampers 26 to a more closed position with the result that the air discharge from the anemostat 31 will comprise a majority of fresh cool air and a minority of heated recirculated return air. Should the temperature fall below a predetermined figure, the dampers 29 will be moved towards their closed position (but not beyond the minimum established), and the dampers 26 will be moved to their more open position with the result that a greater preponderance of recirculated return air is discharged into the room. In any event, the fresh cold air does not come into contact with the heating coil but is simply mixed with the return air, which if needed, was heated by the coils 22.

At 4:30, when the children and faculty have left the school, the time clock will act to open the switch 73a. This, of course, results in the electric circuits through the automatic starter 74 and through the air compressor starter 72a being broken and these elements de-energized. When this happens the individual fan blowers 39 are stopped and the individual room thermostats 59 are rendered inoperative. It should be remembered that when the thermostats 59 are cut off from their supply of compressed air, the dampers 29 return to their full closed position and the dampers 26 to their full open position. It is contemplated that some heat will be in the coils 22 at all times as is the usual situation. The starter 74 having been rendered inoperative and the starter 72a for the air compressor having also been deenergized, provision must be made to prevent the building from becoming too cold during the period from 4:30 p. m. to 8 o'clock a. m. Thus I have provided a master thermostat 75 which is to be positioned in any desired room. Such room will be selected according to what appears to most nearly resemble the average status of the building at any given time. This thermostat will be so arranged that when the temperature gets below a certain minimum figure, say 60° F., it will complete the connection between leads 82 and 83. Such completion establishes a circuit through the automatic starter 74 as above described but it does not in any way effect the starter 72a for the air compressor 72. When the thermostat 75 completes this connection, the individual motors 39 are actuated in all of the rooms and air is withdrawn from the room through the return air inlet 25 and recirculated into the room through the supply plenum 30. It should be noted however, that no fresh air is at this time admitted into the unit. This system during the night hours, simply recirculates the already somewhat warm air without adding to it any cold, fresh air. This makes for an economical way of maintaining minimum temperatures during the night hours. And since this is strictly a function of the night system, the fact that no fresh air is now being circulated does not cause any concern for the reason that there will be no persons then in the building.

When the temperature of the building has again been brought to its normal minimum night temperature, the thermostat 75 will break the connection between lines 82 and 83 with the result that the automatic starter 74 will again be de-energized as will the individual blower motors 39. At 8 o'clock in the morning the time clock 73 will again cause the switch 73a to close and the system will again be operated on an individual basis as determined by the various room thermostats 59. It is to be understood that the times selected by me were so selected for purposes of illustration only and do not constitute a limitation upon my invention. It is obvious that any such times as circumstances dictate may be selected. The basic principles of such a system involve, during the day hours, an arrangement wherein each room receives a minimum amount of fresh air, in which in no case is the cold fresh air directly heated by the coils 22, in which the fresh air and heated return air are mixed in a chamber apart from the heat coils, in which the room thermostat is located within the room on that side of the anemostat from which the fresher, cooler air is being discharged, and in which, during the night hours, a minimum temperature is maintained simply by heating recirculated air without the admission of any fresh, cold air.

Having now described the basic room unit and the basic night-day system, I shall proceed with a description of certain modifications of these basic units and systems.

*Heating and ventilating unit for larger rooms*

Figure 9:
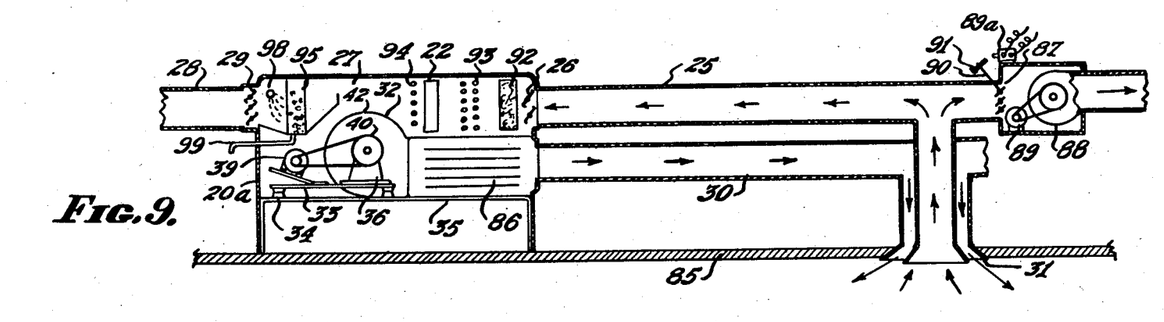
Figure 9 is a front elevational view of a modified room conditioning unit.

Referring now to Figure 9 I have indicated a modified unit which is particularly well suited for heating and ventilating large rooms such as cafeterias, gymnasiums, auditoriums, and night clubs and the like where unusually smoky conditions might prevail. Although I have shown this unit as being mounted above a ceiling 85 it will be understood that this unit could also be mounted at some other spot within the room or even in the hallway in the manner described in connection with the unit of Figure 1. It is also to be understood that such a unit could be incorporated into a night-day system such as I have just described should it be considered desirable to do so.

In view of the fact that many of the features and much of the structure of this modified unit are similar to that of the basic unit, I have designated corresponding parts with like reference numerals. Thus it will be observed that fresh air is brought into the unit through the conduit 28 and past the dampers 29, such air being mixed with heated return air in the area 27. The return air is brought into the unit through conduit 25, past dampers 26 and over the heating coils 22 to the mixing area 27. The blower which is generally indicated at 32 is mounted in a manner similar to that of Figure 1 in that while the motor 39, bearing stand 36 and rotor 40 are all mounted on the resiliently biased member 33, the blower casing 42 is rigidly connected to the frame 20a, or rigidly connected to an acoustical chamber 86 fixed in the frame 20a.

Although it is not shown in this figure, it is to be understood that the dampers 29 and 26 are connected by linkage similar to that disclosed in Figure 1 so that as the dampers 29 move toward open position, the dampers 26 will move toward their closed position.

In the modification of Figure 9, however, I have provided an additional set of dampers as indicated at 87. These dampers are also located in the conduit 25 through which air is returned from the room to the unit. These dampers are also connected by conventional linkage (not shown) with the dampers 26 and 29 so that as the dampers 29 move toward their open position, the dampers 87 will also move toward their open position, it being remembered that at this time the dampers 26 will be moved toward their closed position. In the vicinity of dampers 87 I have provided a discharge fan 88 operated by a motor 89. A switch 89a controls the energization of the motor 89. On one of the damper blades 87 I have fixed a member 90 having an adjustable screw 91 in one end thereof. Whenever the damper blades 87 assume a predetermined open position as desired, the screw 91 will contact the switch 89a and the discharge fan 88 thereby brought into operation. When this happens return air brought from the room is positively discharged from the room and not returned to the unit 20a for further recirculation. While the stale, smoky air is thus being discharged, fresh air is being brought into the room through the conduit 28, dampers 29, blowers 32 and supply plenum 30. If desired, the screw 91 and switch 89a may be so arranged that the positive discharge of air is caused to begin at a point when the dampers 26 are not fully closed with the result that some of the air is discharged and some of it is recirculated. This arrangement is particularly desirable in larger rooms such as auditoriums and cafeterias which are filled up quickly and sporadically.

In the modification of Figure 9 I have also provided an air filter 92 of conventional design, cooling coils 93 and an air purifier 94, which purifier may comprise, for example, a plurality of ultraviolet lights. The cooling coils 93 may be utilized to dehumidify the air being returned from the room to the unit or, in summer, such coils may be used in place of the heating coils 22, or supplemental thereto if the heating coils are also used as cooling coils, whereby the unit 20a will operate as an air cooler rather than as a heating unit.

A much more important modification of my invention is the provision of means whereby the fresh air brought into the unit is ionized before it is discharged into the room. I have discovered that remarkable effects and changes in the ionized status of fresh air can be made if such air is passed over damp, ceramic material. This material may take the form, for example, of earthen briquettes, perhaps of doughnut shape in order to provide a maximum contact surface with a minimum of air resistance. Air which is passed through such ceramic material while the material is being sprayed with fresh water is very appreciably changed in that it is made much more invigorating, and when I speak of the ionization of air it is to this effect that I am referring.

Figure 10:
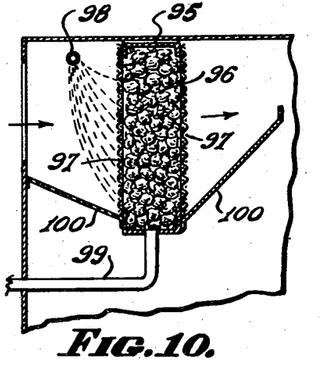
Figure 10 is an enlarged sectional view of a portion of the device shown in Figure 9.

As most clearly shown in Figure 10, I have provided a container 95 in which a supply of ceramic material 96 is placed. The sides of the container may comprise screens or the like 97. Fresh water is sprayed on to the material by means of a spray 98. The water is drained from the container by means of a drain pipe 99. Suitable divisional members 100 serve to properly direct the flow of fresh air through the water sprinkled, earthen briquettes 96. This discovery of mine that air can be ionized by passing it through dampened ceramic material constitutes an important part of my invention. Although not shown in this figure, it is to be understood that the dampers 29 and 26 and blower motor 39 may be controlled through timing mechanism 73 and thermostats 59 in a manner similar to that described in connection with the unit shown in Figure 1.

*Radiant heating and ventilating unit*

Another modification of the basic unit of my invention is shown in Figures 14 through 17. I have again designated those parts of this unit which correspond to similar parts in the unit of Figure 1 with like reference numerals. This particular embodiment of my invention utilizes a unit 20b which is generally the same as basic unit 20 in combination with means whereby the floor of the particular room in question is supplied with radiant heat. Such a unit is particularly desirable for use in kindergarten rooms and the like where small children spend a great deal of time on the floor.

Figures 14, 15, 17:
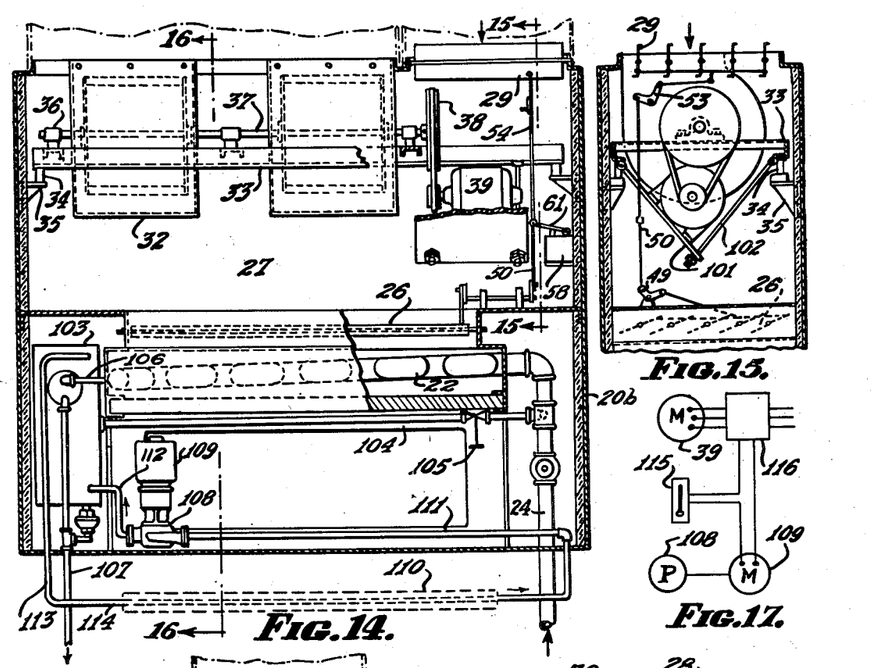
Figure 14 is a view partly in section and partly in vertical elevation of that modification of my unit which incorporates means for supplying radiant heat to the floor of the room being heated.
Figure 15 is a section taken on the line 15—15 of Figure 14.
Figure 17 is a diagrammatic view of the control circuit for the unit shown in Figure 14.
Figure 16:
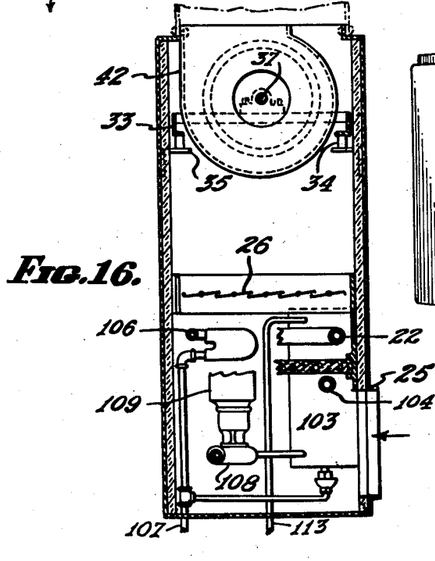
Figure 16 is a section taken on the line 16—16 of Figure 14.

From the drawings it will again be apparent that the blowers 32 are resiliently mounted against vibration in the manner described in connection with the unit of Figure 1. I have provided a slightly different arrangement for supporting the motor 39 in that it is shown as mounted on a hinged platform 101, the platform being hinged from one member 33 and connected by a suitable tie rod 102 with another member 33, both such members being resiliently mounted on rubber matting 34.

The arrangement of the blowers 32 is slightly different than that shown in Figure 1 in that the blowers are not positioned side by side in close contact with one another. Thus in the unit of 20b it is possible for the mixture of fresh air and return air to leave the area 27 by passing between pairs of the blowers 32 rather than be positively discharged by passing into the interior of the blower proper. I have found such arrangement quite satisfactory and in some situations it is more convenient to install the blowers in this manner. At any rate, the basic principle that the fresh air does not come in contact with the heating coils is strictly adhered to. The only air which is heated by the coils 22 is that air which is returned from the room and then passed into the mixing area 27 past the dampers 26. Although I have not shown a lost motion connection between the links 50 and 54, it is to be understood that an arrangement similar to that generally indicated at 55 in Figure 1 can here be incorporated if it is desired or if a minimum setting of the fresh air dampers 29 is required.

A heat exchanger 103 of conventional design is incorporated in the left hand lower corner of the unit as viewed in Figure 14. Steam is introduced into the coil 22 from a supply pipe 24 and into the heat exchanger 103 by means of a branch pipe 104 coming from the supply line 24. A valve in this branch line is indicated at 105. Spent steam or condensed water from the coils 22 flows through a drain 106 into the drain 107 provided for the heat exchanger 103.

Also in the lower portion of the unit 20b, I have provided a pump 108 and a motor 109 therefor. A suitable floor panel or series of pipes mounted therein is diagrammatically represented at 110. Water, or preferably some liquid antifreeze is pumped through the floor panel 110 by means of the pump 108 and its motor 109. Such water or anti-freeze solution is conducted through piping 111, 112, the heat exchanger 103, piping 113 and piping 114 from whence it is recirculated through the floor panel 110.

As diagrammatically illustrated in Figure 17, the pump motor 109 is made responsive to a thermostat 115 so located with respect to the connection box 116 that hot anti-freeze solution is pumped through the floor panel according to the needs of the room. It will be understood that the fan motors 39 and the upper part of unit 20b will operate in a manner similar to that of the basic unit shown in Figure 1.

Although for the purpose of illustration I have indicated that the pump 108 is governed by a thermostat 115 apart from the thermostat 59 by means of which the dampers 26 and 29 are regulated, it is to be understood that in the preferred form of my invention the thermostat 59 is so arranged that it controls the operation of pump 108 as well as the dampers 26 and 29. In such an arrangement, it is possible that it will be necessary to place the thermostat 59 at some position other than that shown in Figure 4 for example, for it should be so positioned that it is responsive to floor conditions as well as to space conditions. In any event, it is a distinct feature of my invention to combine a novel air conditioning unit as developed by me with a radiant heating system as just described.

As will be readily apparent to those skilled in the art, modifications may be made in my invention without departing from the scope and spirit thereof, and while I have shown my invention as embodied in certain structure for the purpose of illustration, I do not intend to be limited by such structure except insofar as it is specifically set forth in the subjoined claims. Having thus described my invention, what I claim as new and what I desire to protect by United States Letters Patent is:

1. In a unit for conditioning the air contained within a closed area, a heating chamber, air heating means within said chamber, a conduit extending between said closed area and said chamber, a second chamber in said unit remote from said air heating means, a conduit extending between said second chamber and the out-of-doors, dampers for controlling the admission of fresh air from the out-of-doors into said second chamber, a supply plenum extending between said second chamber and said closed area, dampers for controlling the admission of heated air from said first chamber to said second chamber, and means for forcing air from said second chamber through said supply plenum into said closed area, and linkage between said heated air dampers and said fresh air dampers arranged so that as one set of said dampers moves towards a closed position the other set of said dampers moves towards an open position, means for actuating said linkage in response to the temperature conditions of said closed area, said last mentioned means comprising a thermostat located in said closed area and a damper motor operatively associated with said thermostat, and said linkage including a lost motion arrangement arranged so that when said dampers are moved in response to said thermostat said fresh air dampers are moved to a predetermined position of minimum opening before any corresponding movement of the heated air dampers can take place.

2. The unit of claim 1 in which said thermostat is of the fluid pressure type and in which when said fluid pressure is cut-off from said thermostat said sets of dampers are not responsive to the temperature of said closed area and said fresh air dampers are fully closed and said heated air dampers are fully open.

3. The unit of claim 2 in which said lost-motion arrangement comprises a cylinder fixed to one linkage member, a piston fixed to another linkage member and seating in said cylinder, and means for supplying fluid pressure to said cylinder, said means being operative at all times said thermostat is supplied with fluid pressure.

4. In a unit for conditioning the air contained within a closed area, a heating chamber, air heating means within said chamber, a conduit extending between said closed area and said chamber, a second chamber in said unit remote from said air heating means, a conduit extending between said second chamber and the out-of-doors, dampers for controlling the admission of fresh air from the out-of-doors into said second chamber, a supply plenum extending between said second chamber and said closed area, dampers for controlling the admission of heated air from said first chamber to said second chamber, means for forcing air from said second chamber through said supply plenum into said closed area, in which the closed area includes a floor having fluid conducting means located therein, and said unit includes means for heating a fluid and means for forcing said heated fluid through said conducting means.

5. The unit of claim 4 in which said fluid heating means comprises a heat exchanger and said fluid forcing means comprises a pump, and including a thermostat located in said closed area, said dampers and said forcing means being responsive to said thermostat.

6. In a system for air conditioning a building made up of a plurality of rooms, a conditioning unit for each room desired to be conditioned; said unit comprising means for drawing fresh air from the out-of-doors, means for withdrawing air from the room to be conditioned, means for heating said withdrawn air, means for blowing a mixture of said heated withdrawn air and said fresh air into the room, a thermostat in said room, dampers for controlling the amount of fresh air taken into the unit, dampers for controlling the amount of heated withdrawn air mixed with said fresh air, said dampers being so interconnected that when said fresh air dampers are fully closed said heated withdrawn air dampers are fully open, means for rendering said thermostat operative and inoperative, said dampers being responsive to said thermostat when operative whereby said dampers vary between their open and closed positions in response to the temperature of said room, said fresh air dampers being fully closed and said heated withdrawn air dampers being fully open when said thermostat is inoperative; common means for simultaneously rendering each of said thermostats operative or inoperative, common means for simultaneously rendering each of said blowing means operative or inoperative, timing means operatively associated with each of said last mentioned common means whereby said common means are simultaneously actuated; and a master thermostat located in said building, said master thermostat being operatively associated with the said common means which control the individual blowing means, this last mentioned association being independent of the said timing means whereby said individual blowing means may be actuated by their said common control means when said room thermostats are inoperative and the fresh air dampers fully closed and the heated withdrawn air dampers fully open, whereby air is withdrawn from each of the rooms, heated and blown back into the room without any fresh air being added; whereby when the timing means actuates both of said common means a mixture of fresh air and heated air is blown into each of the rooms in response to the respective room thermostats.

7. A system for air conditioning a building having a plurality of rooms, said system comprising a unit for each room, each said unit comprising: means for drawing in outside air, means for withdrawing air from said room, means for heating only said room air, means for mixing said heated room air and outside air, a blower for moving said mixed air into said room, means controlling the proportions of room air and outside air being mixed over a range from room air only on the one hand to outside air only on the other hand, said controlling means at rest being arranged to supply only room air, and a thermostat for actuating said controlling means; enabling means for said thermostats, and clock means for energizing said enabling means and said blowers; and an independent thermostat for actuating said blower.

8. A system for air conditioning a building made up of a plurality of rooms which system includes a unit for each room, each unit having a heating chamber, air heating means within said chamber, a conduit extending between said room and said chamber, a second chamber in each said unit remote from said air heating means, a conduit extending between said second chamber and the out-of-doors, dampers for controlling the admission of fresh air from the out-of-doors into said second chamber, a supply plenum extending between said second chamber and said room, dampers for controlling the admission of heated air from said first chamber to said second chamber, means for forcing air from said second chamber through said supply plenum into said room, linkage between said heated air dampers and said fresh air dampers arranged so that as one set of said dampers moves towards a closed position the other set of said dampers moves toward an open position, and means for actuating said linkage in response to the temperature conditions of said room, said last mentioned means comprising a thermostat located in said room and a damper motor operatively associated with said thermostat; common means for rendering each of said thermostats operative and inoperative, common means for operating each of said air forcing means, timing mechanism operatively associated with each of said common means and a master thermostat operatively associated with said second mentioned common means independently of said timing mechanism.

9. In a unit for conditioning the air contained within a closed area, a heating chamber, air heating means within said chamber, a conduit extending between said closed area and said chamber, a second chamber in said unit remote from said air heating means, a conduit extending between said second chamber and the out-of-doors, dampers for controlling the admission of fresh air from the out-of-doors into said second chamber, a supply plenum extending between said second chamber and said closed area, dampers for controlling the admission of heated air from said first chamber to said second chamber, means for forcing air from said second chamber through said supply plenum into said closed area, said fresh air conduit being located so as to discharge fresh air into said second chamber at one side of said supply plenum whereby the air entering the closed area through said supply plenum is cooler at one side of said supply plenum than at the other, a thermostat in said room and located on that side of the supply plenum from which the cooler air is discharged, and exhaust means in said closed area located on that side of said supply plenum which is opposite from said thermostat, said thermostat being operatively connected with said unit.

10. In a unit for conditioning the air contained within a closed area, a heating chamber, air heating means within said chamber, a conduit extending between said closed area and said chamber, a second chamber in said unit remote from said air heating means, a conduit extending between said second chamber and the out-of-doors, dampers for controlling the admission of fresh air from the out-of-doors into said second chamber, a supply plenum extending between said second chamber and said closed area, dampers for controlling the admission of heated air from said first chamber to said second chamber, means for forcing air from said second chamber through said supply plenum into said closed area, a linkage between said dampers whereby as one set of said dampers is moved towards closed position the other set of said dampers is moved towards open position, and a third set of dampers associated with said first mentioned conduit, and exhaust means for discharging air from said first mentioned conduit through said third set of dampers, said third set of dampers being linked to said first two sets of dampers in such manner that as said first mentioned dampers are opened, said second mentioned dampers are closed and said third set of dampers are opened, said exhaust means being operable only when said third set of dampers is open, and said exhaust means comprising a blower, and a motor for said blower and a switch for said motor which is actuated by said third set of dampers.

References Cited in the file of this patent

UNITED STATES PATENTS

| Number | Name | Date |
|---|---|---|
| 1,065,393 | Powers | June 24, 1913 |
| 1,123,334 | Ludlow et al. | Jan. 5, 1915 |
| 1,202,853 | Kinealy | Oct. 31, 1916 |
| 1,296,394 | Hubbard | Mar. 4, 1919 |
| 1,550,714 | Stacey | Aug. 25, 1925 |
| 1,626,172 | Wolfe | Apr. 26, 1927 |
| 1,753,156 | Otis | Apr. 1, 1930 |
| 1,949,522 | Williams | Mar. 6, 1934 |
| 2,090,624 | Drake | Aug. 24, 1937 |
| 2,174,710 | Wagner | Oct. 3, 1939 |
| 2,216,551 | Ewald | Oct. 1, 1940 |
| 2,227,359 | Metzger | Dec. 31, 1940 |
| 2,235,620 | Nessell | Mar. 18, 1941 |
| 2,249,484 | Miller | July 15, 1941 |
| 2,309,224 | Terry | Jan. 26, 1943 |
| 2,571,958 | Slaughter | Oct. 16, 1951 |

FOREIGN PATENTS

| Number | Country | Date |
|---|---|---|
| 431,309 | Great Britain | July 4, 1935 |